(12) United States Patent
Lee et al.

(10) Patent No.: US 8,687,200 B2
(45) Date of Patent: Apr. 1, 2014

(54) METHOD AND DEVICE FOR MEASURING MOTION ERROR OF LINEAR STAGE

(75) Inventors: Sun-Kyu Lee, Gwangju (KR); ChaBum Lee, Gwangju (KR); Gyu Ha Kim, Gwangju (KR)

(73) Assignee: Gwangju Institute of Science and Technology, Buk-Gu, Gwangju (KR)

( * ) Notice: Subject to any disclaimer, the term of this patent is extended or adjusted under 35 U.S.C. 154(b) by 131 days.

(21) Appl. No.: 13/479,933

(22) Filed: May 24, 2012

(65) Prior Publication Data

US 2012/0314220 A1 Dec. 13, 2012

(30) Foreign Application Priority Data

Jun. 10, 2011 (KR) .......................... 10-2011-0056473

(51) Int. Cl.
*G01B 9/02* (2006.01)
*G01N 21/86* (2006.01)
*G01V 8/00* (2006.01)
*G01D 5/36* (2006.01)

(52) U.S. Cl.
USPC ...... 356/494; 356/493; 250/559.3; 250/237 G

(58) Field of Classification Search
USPC ......... 356/493, 494, 499, 500, 508, 510, 498, 356/138, 140, 141.1–141.5, 614–616, 620; 250/221, 548, 559.3, 237 G, 559.29, 250/559.32, 559.37, 559.38; 33/1 M, 1 N, 33/DIG. 3, 707, 706, 503, 568, 573

See application file for complete search history.

(56) References Cited

U.S. PATENT DOCUMENTS 6,559,955 B2 * 5/2003 Tenjimbayashi .............. 356/614
2011/0310396 A1 * 12/2011 Tamiya ......................... 356/498

OTHER PUBLICATIONS

ChaBum Lee, et al., "Design and construction of a single unit of a multi-function optical encoder for a six-degree-of-freedom posture measurement in an ultraprecision linear stage", The European Society for Precision Engineering and Nanotechnology, May 25, 2011, 24 pages.

* cited by examiner

*Primary Examiner* — Gregory J Toatley
*Assistant Examiner* — Willie Merrell, II
(74) *Attorney, Agent, or Firm* — Nath, Goldberg & Meyer; Joshua B. Goldberg

(57) ABSTRACT

Measurement of motion errors of a linear stage is performed to enable accurate measurement of motion errors in linear directions and a rotational direction in the linear stage using a diffraction grating. A first beam splitter splits a laser beam emitted from a light emitting unit. A first measurement unit measures a unidirectional linear motion error of the linear stage using one laser beam component split by the first beam splitter and a second measurement unit measures an angular motion error and another unidirectional linear motion of the linear stage error using a diffracted beam component obtained by diffracting another laser beam component split by the first beam splitter through the diffraction grating. A third measurement unit circularly polarizes the beam component diffracted through the diffraction grating to measure a third unidirectional linear motion error of the linear stage.

12 Claims, 4 Drawing Sheets

(a) Response to roll error (b) Response to pitch error (c) Response to yaw error (d) Response to ΔY

METHOD AND DEVICE FOR MEASURING MOTION ERROR OF LINEAR STAGE

CROSS-REFERENCE TO RELATED APPLICATION

This application claims the benefit under 35 U.S.C. §119 of Korean Patent Application No. 10-2011-0056473, filed on Jun. 10, 2011 in the Korean Intellectual Property Office, the entirety of which is incorporated herein by reference.

BACKGROUND

1. Technical Field

The present invention relates to a method and device for measuring motion errors of a linear stage. More particularly, the present invention relates to a method and device for measuring motion errors of a linear stage, which can accurately measure motion errors in linear and rotational directions of the linear stage.

2. Description of the Related Art

With industrial development in recent years, products and components are increasingly reduced in size and augmented with new functions, and demand for production techniques capable of providing nano-scale precision is present with the development of IT, BT and NT fields. Among production systems developed to cope with such circumstances, ultra-precision linear stages configured to perform linear motion have been continuously developed.

Although such a linear stage is configured to perform linear motion, the linear stage entails various errors including errors in a moving direction thereof. By way of example, a linear stage moving along a linear guide entails a rolling error, a pitching error, and a yawing error, which are error components of rotational motion in x, y and z-axes, respectively, when the linear stage moves in the x-axis direction.

For the ultra-precision linear stage, such errors cause significant problems, and thus it is very important to ascertain precision of the linear stage based on measurement of such errors.

Conventionally, such errors are measured simultaneously using various devices, including a laser interferometer, autocollimator, capacitive sensor, and the like.

In a conventional measurement method, however, various measuring devices are used at the same time, making it difficult to install and operate the devices and providing installation errors. Furthermore, the conventional method has difficulty ascertaining accuracy of measured values, irrespective of high likelihood of errors.

Moreover, since the laser interferometer and the autocollimator applied to the conventional measurement method are very expensive, purchase of all of these devices entails a significant economic burden.

BRIEF SUMMARY

Therefore, the present invention is aimed at providing a method and device for measuring motion errors of a linear stage, which enable accurate measurement of the motion errors in the linear stage in real time through an integrated device.

In accordance with an aspect of the present invention, a device for measuring motion errors of a linear stage including a diffraction grating includes: a light emitting unit which emits a laser beam; a first beam splitter which splits the laser beam emitted from the light emitting unit; a first measurement unit which measures a unidirectional linear motion error of the linear stage using one laser beam component split by the first beam splitter; a second measurement unit which measures an angular motion error and another unidirectional linear motion of the linear stage error using a diffracted beam component obtained by diffracting another laser beam component split by the first beam splitter through the diffraction grating; and a third measurement unit which circularly polarizes the beam component diffracted through the diffraction grating to measure a third unidirectional linear motion error of the linear stage.

The first measurement unit may include a first position detector and a reflection unit which receives one laser beam component split by the first beam splitter and reflects the one laser beam component in an axial direction, in which the linear stage is driven, to transfer the one laser beam component to the first position detector.

The first measurement unit may detect the unidirectional linear motion error based on positional variation of the first position detector.

The reflection unit may be composed of a corner cube.

The second measurement unit may include a 0th order position detector receiving a laser beam component subjected to 0th order diffraction through the diffraction grating, a +1st order position detector receiving a laser beam component subjected to +1st order diffraction through the diffraction grating, and a −1st order position detector receiving a laser beam component subjected to −1st order diffraction through the diffraction grating.

The +1st order position detector may be provided at a front side thereof with a second beam splitter and the −1st order position detector may be provided at a front side thereof with a third beam splitter.

The second measurement unit may measure the other unidirectional linear motion error and the angular motion error based on positional variation of the respective beams detected by the 0th order position detector, the +1st order position detector and the −1st order position detector.

The third measurement unit may include a first polarized beam splitter that receives the laser beam components subjected to +1st order diffraction and −1st order diffraction through the diffraction grating to split the +1st order and −1st order diffracted beams via polarization; λ/4 polarization sheets A and B disposed at a rear side of the first polarized beam splitter; a second polarized beam splitter which splits a beam component passing through the λ/4 polarization sheet A via polarization; first and second light detectors which detect beam components split by the second polarized beam splitter; a third polarized beam splitter which splits a beam component passing through the λ/4 polarization sheet B via polarization; and third and fourth light detectors which detect beam components split by the third polarized beam splitter.

In accordance with another aspect of the present invention, a method of measuring motion errors of a linear stage including a diffraction grating includes: (a) emitting and splitting a laser beam; (b) measuring a unidirectional linear motion error of the linear stage using one split laser beam component; (c) measuring an angular motion error and another unidirectional linear motion error of the linear stage using a diffracted beam component obtained by diffracting another split laser beam component through a diffraction grating; and (d) circularly polarizing beam components diffracted through the diffraction grating to measure a third unidirectional linear motion error of the linear stage.

The measuring a unidirectional linear motion error may include reflecting the one split laser beam component by a reflection unit of the linear stage in an axial direction in which the linear stage is driven, detecting the reflected beam component, and comparing a position of the detected beam component with a reference position.

The measuring an angular motion error and another unidirectional linear motion error may include receiving laser beam components subjected to 0th order diffraction, +1st order diffraction and −1st order diffraction through the diffraction grating, and comparing detected positions of the 0th order, +1st order and −1st order diffracted laser beam components with reference positions thereof.

The circularly polarizing beam components may be performed by circular polarization interferometry by splitting the +1st order and −1st order diffracted beam components via polarization to obtain λ/4 polarized beam components from the +1st order and −1st order diffracted beam components, splitting the 214 polarized beam components via polarization, and detecting the split beam components.

BRIEF DESCRIPTION OF THE DRAWINGS

The above and other aspects, features, and advantages of the invention will become apparent from the detailed description of the following embodiments in conjunction with the accompanying drawings, in which.

DETAILED DESCRIPTION

Figure 1:
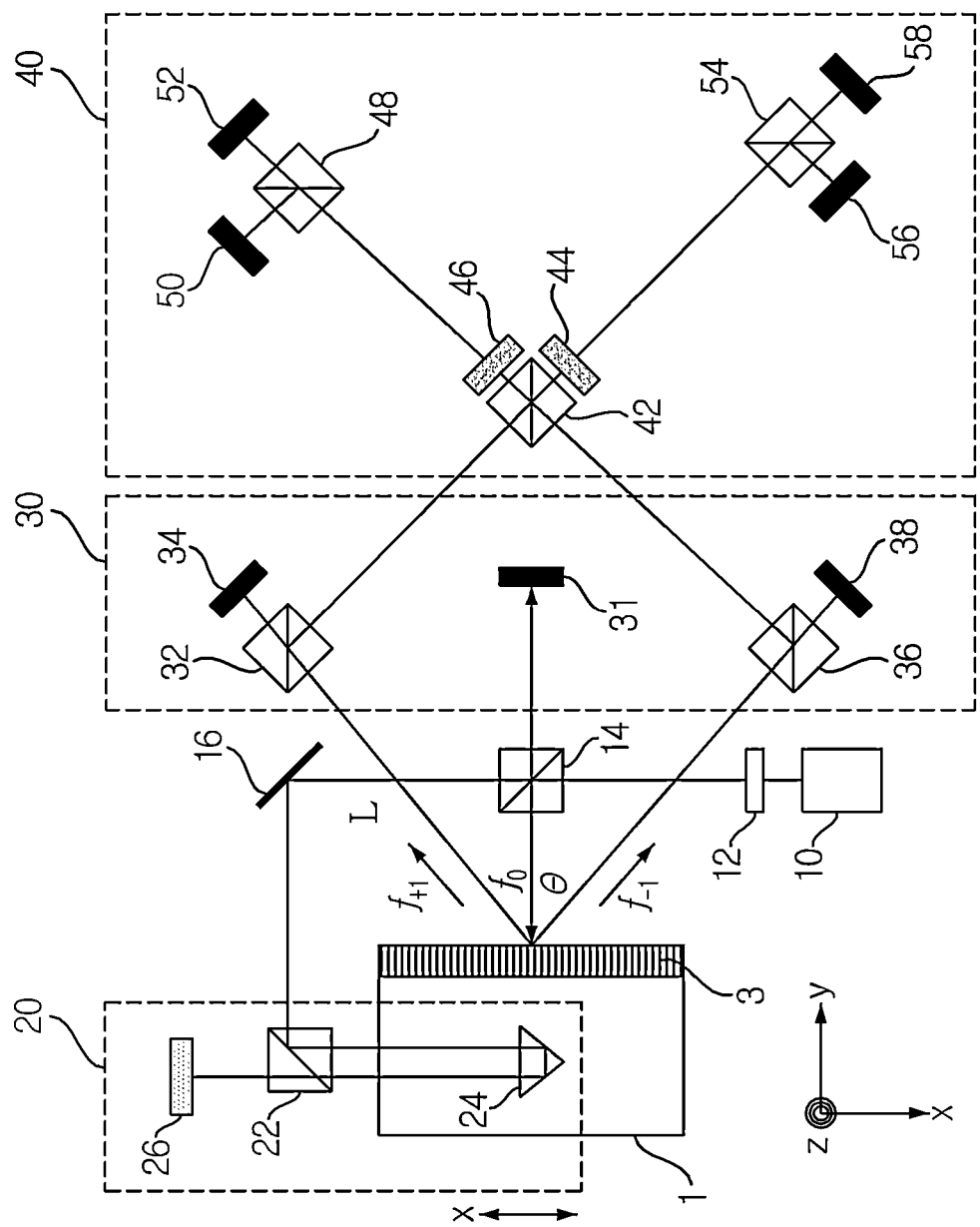
FIG. 1 is a diagram of a device for measuring motion errors of a linear stage in accordance with one exemplary embodiment of the present invention.

Exemplary embodiments of the present invention will now be described in detail with reference to the accompanying drawings. It should be noted that like components will be denoted by like reference numerals throughout the specification and the drawings. In addition, description of details apparent to those skilled in the art will be omitted for clarity. Further, it should be understood that the present invention is not limited to the following embodiments and may be embodied in different ways by those skilled in the art without departing from the scope of the present invention.

FIG. 1 is a diagram of a device for measuring motion errors of a linear stage in accordance with one exemplary embodiment of the present invention.

A linear stage 1 may be linearly operated in various ways, including ball-screw operation, linear motor operation, piezoelectric transducer operation, and the like. For enhanced precision in linear operation of the linear stage 1, it is necessary to achieve accurate measurement not only of X, Y and Z-axis linear motion errors, but also of angular motion errors such as pitch, yaw and roll errors, and to perform feedback control based on the measurement result. The present invention provides a method and device for accurately measuring motion errors in such a linear stage 1.

Referring to FIG. 1, the device for measuring motion errors in the linear stage 1 according to one exemplary embodiment includes a light emitting unit 10 for emitting a laser beam at a predetermined wavelength, a first measurement unit 20 for measuring a unidirectional linear motion error of the linear stage 1, a second measurement unit 30 for measuring angular motion errors and another unidirectional linear motion error of the linear stage 1, and a third measurement unit 40 for measuring a third unidirectional linear motion error of the linear stage 1. The device further includes a diffraction grating 3 disposed at one side of the linear stage 1.

The light emitting unit 10 may be embodied by a laser diode, which can inject a laser beam in a certain wavelength range. In some embodiments, a stabilized He—Ne laser may be used.

A polarizer 12 may be placed in front of the light emitting unit 10 to polarize a laser beam emitted from the light emitting unit 10 in a predetermined direction. The polarizer 12 may be configured to polarize the laser beam at 45° to an optical axis. After passing through the polarizer 12, the laser beam passes through or is reflected by a first beam splitter 14. A laser beam component passing through the first beam splitter 14 is reflected by a reflector plate 16 to be directed to a first measurement unit 20, and a laser beam component reflected by the first beam splitter 14 is directed to the diffraction grating 3, which moves together with the linear stage 1.

The first measurement unit 20 includes an optical path providing unit 22, a corner cube 24, which moves together with the linear stage 1, and a first position detector 26. In the coordinate system of FIG. 1, the first measurement unit 20 detects a linear motion error (ΔZ), which is a Z-axis motion error of the linear stage 1. In one embodiment of the first measurement unit 20 with reference to FIG. 1, a laser beam component passing through the first beam splitter 14 is sequentially reflected by the reflector plate 16 and the optical path providing unit 22 to be directed to the corner cube 24 disposed in the linear stage 1. Then, the laser beam component is reflected twice by the corner cube 24 and is directed to the first position detector 26 through the optical path providing unit 22. The first position detector 26 is configured to receive the reflected laser beam component in order to obtain a two-dimensional position of the laser beam component, and may be embodied by a CCD, CMOS or like component. Herein, second and third position detectors described below have the same configuration as the first position detector.

Meanwhile, the laser beam component reflected by the first beam splitter 14 is diffracted by the diffraction grating 3. Here, the beam component is diffracted into a 0th order beam component, +1st order beam component, and −1st order beam component by the diffraction grating 3 before traveling to the second measurement unit 30.

The second measurement unit 30 includes a 0th order position detector 31, second beam splitter 32, +1st order position detector 34, third beam splitter 36, and −1st order position detector 38.

The diffraction grating 3 is a reflection type diffraction grating and generates diffracted beam components corresponding to the respective diffraction orders through diffraction of a laser beam. The diffraction grating 3 is composed of a plurality of gratings such that a laser beam emitted from the light emitting unit 10 is split via diffraction. Here, the distances between the 0th order, +1st order, and −1st order beam components are determined according to the pitch of the respective gratings, and light intensity ratios between the 0th order, +1st order, and −1st order beam components are determined according to the depths of the gratings.

The 0th order beam component diffracted by the diffraction grating 3 is directed to the 0th order position detector 31. The +1st order beam component diffracted by the diffraction grating 3 is directed to the +1st order position detector 34 through the second beam splitter 32 and the −1st order beam component diffracted by the diffraction grating 3 is directed to the −1st order position detector 38 through the third beam splitter 36. The beam components reflected by the second and third beam splitters 32, 36 are directed to a polarized beam splitter 42 disposed in the third measurement unit 40. In the coordinate system of FIG. 1, the second measurement unit 30 measures angular motion errors (eX, eY, eZ) by rotation of the linear stage 1 and a linear motion error (ΔY) in the Y-axis direction.

The third measurement unit 40 includes a first polarized beam splitter 42, a second polarized beam splitter 48, first and second light detectors 50, 52, a third polarized beam splitter 54, and third and fourth light detectors 56, 58. Each of the first, second and third polarized beam splitters 42, 48, 54 splits an incident laser beam component via polarization.

The beam components reflected by the second and third beam splitters 32, 36 in the second measurement unit 30 are directed to the second and third polarized beam splitters 48, 54 through the first polarized beam splitter 42, respectively. The first polarized beam splitter 42 is provided at a rear side thereof with λ/4 polarization sheets 44, 46. With this configuration, the beam components passing through the first polarized beam splitter 42 are subjected to circular polarization through the λ/4 polarization sheets corresponding thereto and are then directed to the second and third polarized beam splitters 48, 54.

Two beam components split by the second polarized beam splitter 48 are detected by the first and second light detectors 50, 52, and two beam components split by the third polarized beam splitter 54 are detected by the third and fourth light detectors 56, 58. Here, the beam components detected by the first to fourth light detectors 50, 52, 54, 56 have respective phase differences of 0°, 180°, 90°, and 270°. In the coordinate system of FIG. 1, the third measurement unit 40 detects a linear motion error (ΔX), which is an X-axis motion error of the linear stage.

Figure 2:
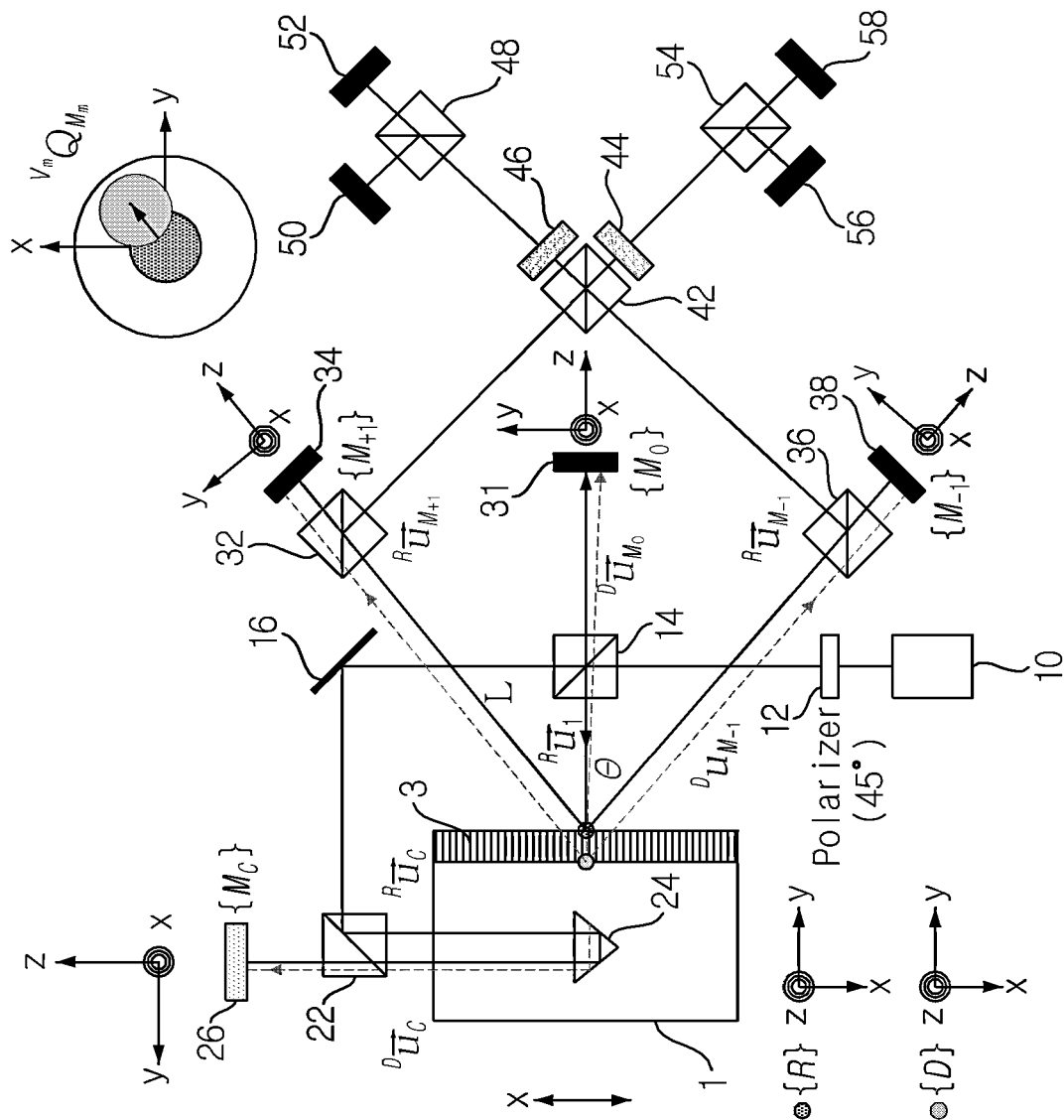
FIG. 2 is a diagram of a process of detecting motion errors of a linear stage in the device in accordance with the exemplary embodiment of the present invention.

FIG. 2 is a diagram of a process of detecting motion errors of a linear stage in the device in accordance with the embodiment of the invention.

Figure 3:
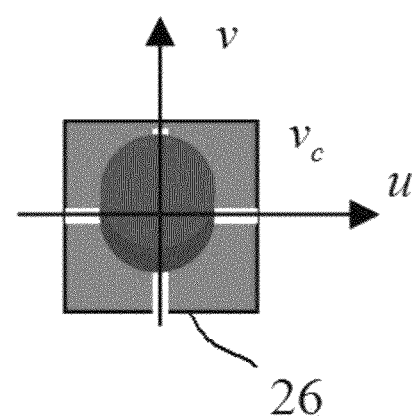
FIG. 3 is a view depicting positional variation of a beam component detected by a first position detector when a Z-axis linear motion error occurs in the linear stage.

For the first measurement unit 20, when a Z-axis linear motion error (ΔZ) occurs in the linear stage 1, a position of a beam component detected by the first position detector 26 is shown as in FIG. 3. Specifically, if the Z-axis linear motion error does not occur, the beam component is placed at the center of the first position detector 26. Conversely, when the Z-axis linear motion error (ΔZ) occurs in the linear stage 1, the beam component is shifted upwards or downwards and detected by the first position detector 26. Accordingly, the Z-axis linear motion error in the linear stage 1 may be measured according to the degree of shift of the beam component detected by the first position detector 26.

The second measurement unit 30 detects angular motion errors and a Y-axis linear motion error in the linear stage 1. That is, the second measurement unit 30 measures angular motion errors (eX, eY, eZ) and a Y-axis linear motion error (ΔY) based on positions of the beam components detected by the $0^{th}$, +1st and −1st order position detectors 31, 34 and 38.

FIGS. 4(a) to 4(d) are diagrams illustrating positional variation of beam components detected by the position detectors and expressed as a vector when pitch, yaw and roll errors and a Y-axis linear motion error occur in the linear stage.

Assuming the reference coordinate system of FIG. 2 is defined as {R} and the coordinate system of the diffraction grating 3 is defined as {D}, a homogeneous transformation matrix (HTM) between the coordinate systems {R} and {D} may be expressed by the following Equation 1.

$$^{R}T_{D} = \begin{bmatrix} 1 & -\varepsilon_Z & \varepsilon_Y & \Delta X \\ \varepsilon_Z & 1 & -\varepsilon_X & \Delta Y \\ -\varepsilon_Y & \varepsilon_X & 1 & \Delta Z \\ 0 & 0 & 0 & 1 \end{bmatrix} \quad \langle\text{Equation 1}\rangle$$

In FIG. 2, coordinate systems $\{M_0\}$, $\{M_{+1}\}$, and $\{M_{-1}\}$ represents coordinate systems at the centers of the 0th order position detector 31, the +1st order position detector, and the −1st order position detector 38, respectively. Meanwhile, Equation 1 may be simplified by Equation 2 using a rotation matrix ($^{R}R_D$) and a translation matrix ($^{R}L_D$).

$$^{R}T_{D} = \begin{bmatrix} ^{R}R_D & ^{R}L_D \\ 0 & 1 \end{bmatrix} \quad \langle\text{Equation 2}\rangle$$

In FIG. 2, a solid line indicates an ideal path of a laser beam component as an initial standard, and a dotted line indicates an actual path of a laser beam component in the linear stage 1. A laser beam emitted from the light emitting unit 10 is expressed by $^{R}\vec{u}_1 = [0\ -1\ 0]^T$ in the {R} coordinate system. When the beam enters the diffraction grating 3 and the linear stage 1 is operated, the coordinate system of the incident beam may be expressed by Equation 3 through transformation to the {D} coordinate system using the rotation matrix ($^{R}R_D$).

$$^{D}\vec{u}_{1,i} = ^{D}R_R{}^{R}\vec{u}_1 = [^{D}\vec{u}_{1,x}\ ^{D}\vec{u}_{1,y}\ ^{D}\vec{u}_{1,z}]^T \quad <\text{Equation 3}>$$

In Equation 3, i denotes elements x, y and z in a vector expression.

After the diffraction grating 3, a unit vector according to the coordinate systems in the 0th order position detector 31, the +1st order position detector 34 and the −1st order position detector 38 may be expressed by Equation 4. In Equation 4, m denotes a diffraction order (+1, 0 or −1) in the diffraction grating 3 and Λ denotes a period of the diffraction grating 3.

$$^{D}\vec{u}_{m,i} = \left[ ^{D}\vec{u}_{1,x} + m\frac{\lambda}{\Lambda}{}^{D}\vec{u}_{1,y}\sqrt{1 - [^{D}\vec{u}_{m,x}]^2 - [^{D}\vec{u}_{m,y}]^2}\ \right] \quad \langle\text{Equation 4}\rangle$$

Meanwhile, a three-dimensional position vector $^{V_{m,i}}\vec{Q}_{M_{m,i}}$ in each of the position detectors 31, 34, 38 of the second measurement unit 30 may be expressed by Equation 5.

$$^{V_{m,i}}\vec{Q}_{M_{m,i}} = ^{V_{m,i}}R_R(^{R}\vec{Q}_D + ^{R}R_D|^{D}\vec{Q}_{m,i}|^{D}\vec{Q}_{m,i}) + ^{V_{m,i}}\vec{Q}_R \quad <\text{Equation 5}>$$

In Equation 5, $^{R}\vec{Q}_D$ is a displacement matrix from {R} to {D} coordinate systems, and $^{V_{m,i}}\vec{Q}_R$ and $^{V_{m,i}}R_R$ are a translation vector and a rotation matrix of the coordinate system {M} for the position detectors with respect to the reference coordinate system {R}, respectively.

In vector calculation, a boundary condition may be defined by $^{V_{m,z}}\vec{Q}_{M_{m,z}} = 0$ since a Z-axis signal in the {M} coordinate system does not have any relation with measurement results. Thus, according to this boundary condition, $|^{D}\vec{Q}_{m,i}|$ may be obtained by Equation 5. Then, the position vector $^{V_{m,i}}\vec{Q}_{M_{m,i}}$ of each of the position detectors 31, 34, 38 may be expected by Equation 5.

Figure 4:
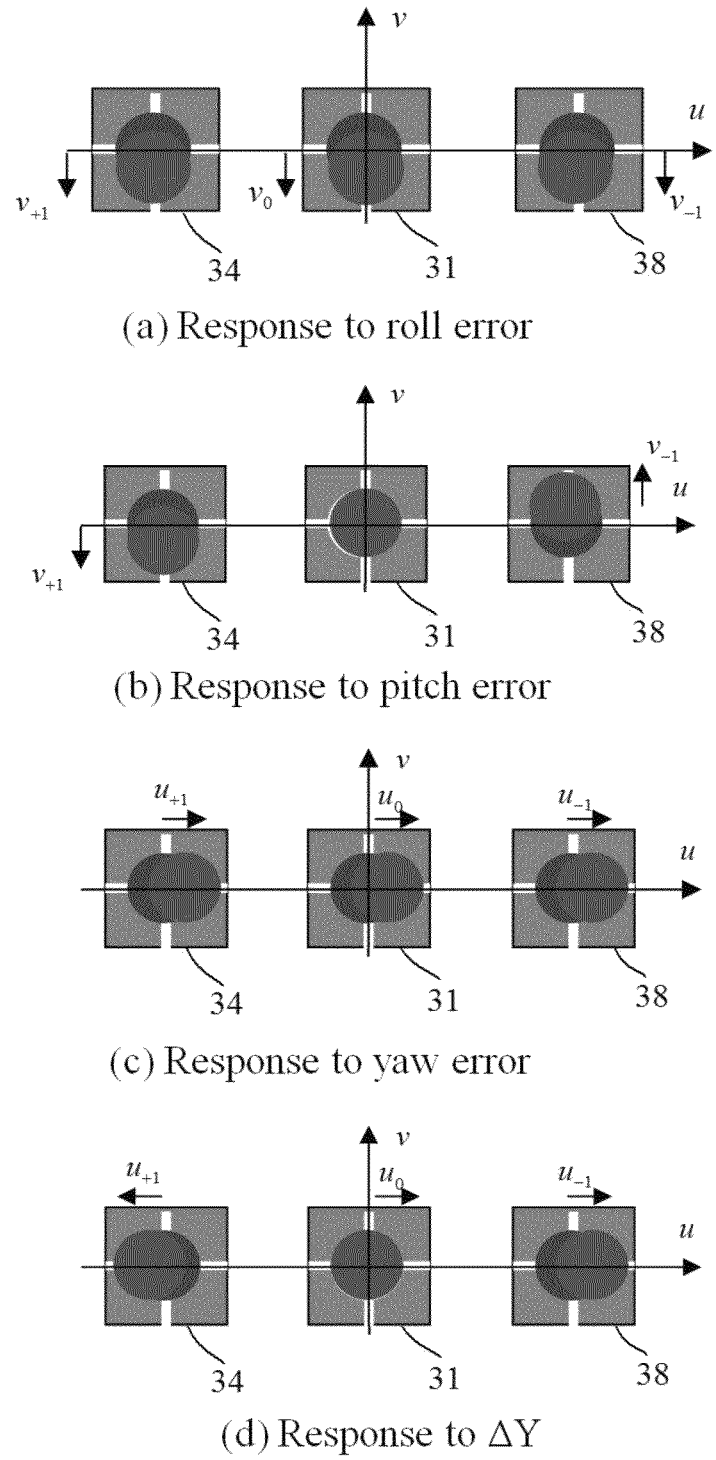
FIGS. 4(a) to 4(d) are diagrams of positional variation of beam components detected by position detectors when pitch, yaw, roll errors and a Y-axis linear motion error occur in a linear stage.

Assuming $|^{D}\vec{u}_{M+1}| = |^{R}\vec{u}_{M+1}|$, $|^{D}\vec{u}_{M0}| = |^{R}\vec{u}_{M0}|$, $|^{D}\vec{u}_{M+1}| = |^{R}\vec{u}_{M+1}|$ at a distance (L≈L+ΔL) between the diffraction grating 3 and each of the position detectors 31, 34, 38, motion errors to be detected by the first and second measurement units 20, 30 may be independently divided in terms of the degree of variation of the beam positions in each of the position detectors. Each of the motion errors may be represented as shown in FIGS. 3 and 4, and the angular motion errors (eX, eY, eZ) may be expressed by Equation 6, and the linear Y-axis motion error (ΔY) and the Z-axis linear motion error (ΔZ) may be expressed by Equation 7.

$$\varepsilon_X = \left(\frac{v_{+1}}{2L_{+1}} + \frac{v_0}{2L_0} + \frac{v_{-1}}{2L_{-1}}\right) \cdot \frac{1}{3}$$ ⟨Equation 6⟩

$$\varepsilon_Y = \left(\frac{u_{+1}}{2L_{+1}} + \frac{u_0}{2L_0} + \frac{u_{-1}}{2L_{-1}}\right) \cdot \frac{1}{3}$$

$$\varepsilon_Z = \left(\frac{v_{+1}}{2L_{+1}} - \frac{u_{-1}}{2L_{-1}}\right) \cdot \frac{1}{2}$$

$$\Delta Y = \left(\frac{u_{+1} - u_{-1}}{2}\right) \cdot \frac{1}{\sin\theta}$$ ⟨Equation 7⟩

$$\Delta Z = \frac{u_C}{2}$$

In Equations 6 and 7, u and v denote variations from a reference point of each of the position detectors 31, 34, 38, and subscripts indicate diffraction orders in the diffraction grating 3. Further, L denotes a distance from a beam position in the diffraction grating 3 to the center of each of the position detectors 31, 34, 38. Motion errors in the linear stage 1 lead to variation of the beam positions in the respective position detectors 31, 34, 38. As shown in FIG. 4, the roll error (eX) horizontally shifts the beam positions in the respective position detectors 31, 34, 38, the pitch error (eZ) vertically shifts the beam positions, and the yaw error (eY) rotates the beam positions in the +1st order position detector 34 and the −1st order position detector 38 while maintaining the beam position at the center in the 0th order position detector 31. In addition, the Y-axis linear motion error (ΔY) shifts the beam positions in the +1st order position detector 34 and the −1st order position detector 38 towards or away from the center defined by the 0th order position detector 31 along a horizontal line. The Z-axis linear motion error (ΔZ) shifts the beam position in the first position detector 26 upwards or downwards along a vertical line.

Next, the configuration for detecting the X-axis linear motion error in the third measurement unit 40 will be descried.

In the present invention, the X-axis linear motion error is detected by the third measurement unit 40 using a circularly polarizing interferometric technique (CPIT).

As described above, the beam components reflected by the first and second beam splitters 32, 36 of the second measurement unit 30 pass through the first polarized beam splitter 42 and reach the second and third polarized beam splitters 48, 54, respectively. The first polarized beam splitter 42 is provided at the rear side thereof with the λ/4 polarization sheets 44, 46. Two λ/4 polarization sheets 44, 46, that is, a λ/4 polarization sheet A 44 and a λ/4 polarization sheet B 46, are provided. With this configuration, the beam components passing through the first polarized beam splitter 42 are subjected to circular polarization through the corresponding λ/4 polarization sheets 44, 46 and are directed to the second and third polarized beam splitters 48, 54. Two beam components split by the second polarized beam splitter 48 are detected by the first and second light detectors 50, 52, and two beams split by the third polarized beam splitter 54 are detected by the third and fourth light detectors 56, 58. Here, the beam components detected by the first to fourth light detectors 50, 52, 56, 58 have respective phase differences of 0°, 180°, 90°, and 270°.

The phase differences in the first to fourth light detectors 50, 52, 56, 58 are used to remove a DC component from each signal, and an AC component in each signal is detected as in Equation 8. The phase may be calculated by a trigonometric function.

$$V_{1-2} = (V_{PD1} - V_{PD2})/2 = \sin(\Delta\phi),$$

$$V_{3-4} = (V_{PD3} - V_{PD4})/2 = \cos(\Delta\phi)$$ <Equation 8>

While the linear stage 1 is moved, relative motion of the linear stage with respect to the diffraction grating 3 allows a diffracted wave to generate phase transition via the Doppler effect. Phase modulation of the +1st order and −1st order diffracted beam components may be interpreted as Doppler frequency transition by a grating velocity. Such frequency transition may be expressed by Equation 9.

$$f_{+1} = f_0 + \frac{\dot{x}}{\Lambda}, \ f_{-1} = f_0 - \frac{\dot{x}}{\Lambda},$$ ⟨Equation 9⟩

$$\Delta f = f_{+1} - f_{-1} = \frac{2\dot{x}}{\Lambda}$$

In Equation 9, $f_{+1}$, $f_0$, and $f_{-1}$ are frequencies of the +1st order, −1st order and 0th order diffracted beam components, $\dot{x}$ is a differential value for a displacement (x). The displacement (x) relates to a phase difference of signals from the four light detectors 50, 52, 56, 58, and may be obtained by phase decoding. The phase difference (Δf) and the displacement may be expressed by Equations 10 and 11, respectively.

$$\Delta\varphi = 2\pi \int_0^t \Delta f \, dt = \frac{4\pi x}{\Lambda}$$ ⟨Equation 10⟩

$$x = \frac{\Delta\phi \cdot \Lambda}{4\pi} = \frac{\Delta\phi \cdot \lambda}{4\pi \cdot \sin\theta}$$ ⟨Equation 11⟩

Finally, the X-axis linear motion error (ΔX) is calculated as a difference between a displacement (xCOMMAND) of the linear stage 1 in response to an actual command and an actual displacement (xACTUAL) in the linear stage 1 measured by the third measurement unit 40, and is expressed by Equation 12.

$$\Delta X = x_{COMMAND} - x_{ACTUAL}$$ <Equation 12>

As such, according to the exemplary embodiments, the device may measure motion errors with 6 degrees of freedom in a linear stage, which requires ultra-precision operation, using a single configuration while enabling effective inspection of characteristics of motions of the linear stage. Further, the device may be embodied by inexpensive components and provide enhanced reliability in measurement of motion errors.

Although some exemplary embodiments have been described herein, it should be understood by those skilled in the art that these embodiments are given by way of illustration only, and that various modifications, variations and alterations can be made without departing from the spirit and scope of the invention. Therefore, the embodiments and the accompanying drawings should not be construed as limiting the technical spirit of the present invention, but should be construed as illustrating the technical spirit of the present invention. The scope of the invention should be interpreted according to the following appended claims as covering all modifications or variations derived from the appended claims and equivalents thereof.

What is claimed is:

1. A device for measuring motion errors of a linear stage including a diffraction grating, comprising:
   a light emitting unit which emits a laser beam;
   a first beam splitter which splits the laser beam emitted from the light emitting unit;
   a first measurement unit which measures a unidirectional linear motion error of the linear stage using one laser beam component split by the first beam splitter;
   a second measurement unit which measures an angular motion error and another unidirectional linear motion of the linear stage error using a diffracted beam component obtained by diffracting another laser beam component split by the first beam splitter through the diffraction grating; and
   a third measurement unit which circularly polarizes the beam component diffracted through the diffraction grating to measure a third unidirectional linear motion error of the linear stage.

2. The device according to claim 1, wherein the first measurement unit comprises a first position detector and a reflection unit, the reflection unit receiving one laser beam component split by the first beam splitter and reflecting the one laser beam component in an axial direction, in which the linear stage is driven, to transfer the one laser beam component to the first position detector.

3. The device according to claim 2, wherein the first measurement unit detects the unidirectional linear motion error based on positional variation of a beam component detected by the first position detector.

4. The device according to claim 2, wherein the reflection unit is a corner cube.

5. The device according to claim 1, wherein the second measurement unit comprises a 0th order position detector receiving a laser beam component subjected to 0th order diffraction through the diffraction grating, a +1st order position detector receiving a laser beam component subjected to +1st order diffraction through the diffraction grating, and a −1st order position detector receiving a laser beam component subjected to −1st order diffraction.

6. The device according to claim 5, wherein the +1st order position detector is provided at a front side thereof with a second beam splitter and the −1st order position detector is provided at a front side thereof with a third beam splitter.

7. The device according to claim 5, wherein the second measurement unit measures the other unidirectional linear motion error and the angular motion error based on positional variation of the beam components respectively detected by the 0th order position detector, the +1st order position detector and the −1st order position detector.

8. The device according to claim 1, wherein the third measurement unit comprises:
   a first polarized beam splitter which receives the laser beam components subjected to +1st order diffraction and −1st order diffraction through the diffraction grating to split the +1st order and −1st order diffracted beams via polarization;
   $\lambda/4$ polarization sheets A and B disposed at a rear side of the first polarized beam splitter;
   a second polarized beam splitter which splits a beam component passing through the $\lambda/4$ polarization sheet A via polarization;
   first and second light detectors which detect beam components split by the second polarized beam splitter;
   a third polarized beam splitter which splits a beam component passing through the $\lambda/4$ polarization sheet B via polarization; and
   third and fourth light detectors which detect beam components split by the third polarized beam splitter.

9. A method of measuring motion errors of a linear stage including a diffraction grating, comprising:
   emitting and splitting a laser beam;
   measuring a unidirectional linear motion error of the linear stage using one split laser beam component;
   measuring an angular motion error and another unidirectional linear motion error of the linear stage using a diffracted beam component obtained by diffracting another split laser beam component through a diffraction grating; and
   circularly polarizing beam components diffracted through the diffraction grating to measure a third unidirectional linear motion error of the linear stage.

10. The method according to claim 9, wherein the measuring a unidirectional linear motion error comprises reflecting the one split laser beam component by a reflection unit of the linear stage in an axial direction in which the linear stage is driven, detecting the reflected beam component, and comparing a position of the detected beam component with a reference position.

11. The method according to claim 9, wherein the measuring an angular motion error and another unidirectional linear motion error comprises receiving laser beam components subjected to 0th order diffraction, +1st order diffraction and −1st order diffraction through the diffraction grating, and comparing detected positions of the 0th order, +1st order and −1st order diffracted laser beam components with reference positions thereof.

12. The method according to claim 9, wherein the circularly polarizing beam components is performed by circular polarization interferometry by splitting the +1st order and −1st order diffracted beam components via polarization to obtain $\lambda/4$ polarized beam components from the +1st order and −1st order diffracted beam components, splitting the $\lambda/4$ polarized beam components via polarization, and detecting the split beam components.

* * * * *